(12) United States Patent
Singh et al.

(10) Patent No.: US 7,836,229 B1
(45) Date of Patent: Nov. 16, 2010

(54) SYNCHRONIZING CONTROL AND DATA PATHS TRAVERSED BY A DATA TRANSACTION

(75) Inventors: Bipin P. Singh, Bangalore (IN); Vivek Garg, Folsom, CA (US); Binata Bhattacharyya, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1025 days.

(21) Appl. No.: 11/474,140

(22) Filed: Jun. 23, 2006

(51) Int. Cl.
*G06F 3/00* (2006.01)
*G06F 5/00* (2006.01)

(52) U.S. Cl. ........................................ 710/52
(58) Field of Classification Search ................ None
See application file for complete search history.

(56) References Cited

U.S. PATENT DOCUMENTS

| | | | |
|---|---|---|---|
| 6,009,488 A | 12/1999 | Kavipurapu | 710/105 |
| 6,385,695 B1* | 5/2002 | Arimilli et al. | 711/122 |
| 7,239,645 B2* | 7/2007 | Suri et al. | 370/412 |
| 2005/0223177 A1 | 10/2005 | Pentkovksi et al. | 711/145 |
| 2007/0050564 A1* | 3/2007 | Gunna et al. | 711/146 |

* cited by examiner

*Primary Examiner*—Henry W Tsai
*Assistant Examiner*—Kris Rhu
(74) *Attorney, Agent, or Firm*—Trop, Pruner & Hu, P.C.

(57) ABSTRACT

In one embodiment, the present invention includes a method for determining if control and data portions of a data transaction are ready to be sent from an interface coupled to a processor core. If so, the data portion may be sent from an entry of a data buffer of the interface, and the entry deallocated. Furthermore, a value corresponding to the deallocated entry may be written in multiple buffers of the interface. In this way, independent paths of the interface may be synchronized. Other embodiments are described and claimed.

23 Claims, 6 Drawing Sheets ditions, causing control and data paths to lose synchronization. Other implementations incorporate a separate path for data transactions of a higher priority, e.g., so-called snoop transactions. Implementation of significant logic or separate paths for given transactions can significantly affect die area consumed and furthermore contribute to additional power consumption.

SYNCHRONIZING CONTROL AND DATA PATHS TRAVERSED BY A DATA TRANSACTION

BACKGROUND

Embodiments of the present invention relate to processors, and more particularly to communication of data transactions throughout a system.

As processors evolve, greater amounts of instructions are performed within a given time and consequently greater amounts of data are passed into and out of a processor. Modern architectures are often formed using multiple cores in a single processor socket. After processing data in a given core, oftentimes the data is sent to other locations of a system as part of a data transaction. Different types of data transactions exist. In a given system protocol, some transactions have a more pressing time constraint than other transactions.

In some system implementations, a simple first-in-first-out (FIFO) buffer is used to store outgoing data transactions which are thus sent from the FIFO buffer in an in-order manner. However, such ordering prevents data transactions of a higher priority from passing transactions of a lower priority. Accordingly, some systems implement significant amounts of logic to enable certain data transactions to pass ahead of other transactions.

Furthermore, some architectures implement split paths, where control portions of a transaction pass through a control path, while data portions of the same transaction pass through a data path. Again, significant logic is needed to maintain synchronization between such paths. Such synchronization is especially needed where the separate paths traverse different clock crossing domains. For example, both control and data paths may cross the same clock crossing, but the service rate of each is dependent on various other conditions, causing control and data paths to lose synchronization. Other implementations incorporate a separate path for data transactions of a higher priority, e.g., so-called snoop transactions. Implementation of significant logic or separate paths for given transactions can significantly affect die area consumed and furthermore contribute to additional power consumption.

DETAILED DESCRIPTION

Figure 1:
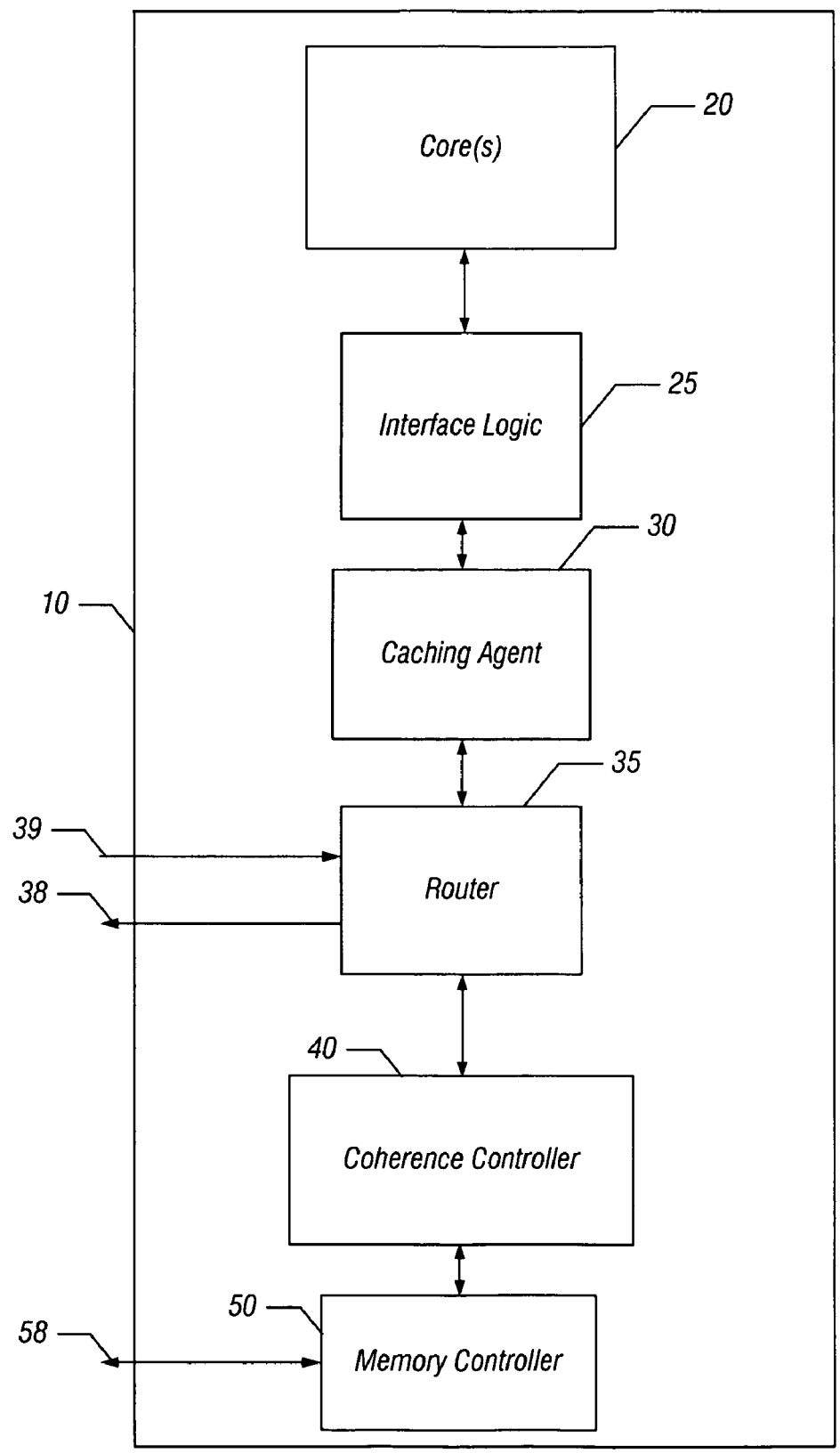
FIG. 1 is a block diagram of a processor socket in accordance with one embodiment of the present invention.

In various embodiments, a processor socket including one or more processor cores and additional logic, controllers, and the like may be used to synchronize independent control and data paths over which data transactions travel through the socket. Referring now to FIG. 1, shown is a block diagram of a processor socket in accordance with one embodiment of the present invention. As shown in FIG. 1, processor socket 10 includes one or more cores 20. For purposes of discussion, it may be assumed that multiple cores 20 are present. Each core may include its own local cache memory, along with a local cache controller. Additionally, cores 20 may further include a global cache controller, in some embodiments. Such a cache hierarchy may be used to store frequently accessed or recently used information in close relation to the cores.

While such a cache hierarchy may provide for efficient accesses to requested information, data processed by one or more cores 20 still needs to be sent out of processor socket 10 as part of desired data transactions. While the scope of such transactions may vary, in various implementations data to be transmitted out of processor socket 10 as part of a data transaction may be modified data that is evicted from a cache by an incoming snoop request. Alternately, data to be transmitted may be a victim eviction, a non-coherent data write or another such data transaction. Such data transactions are issued to an interface logic 25 from cores 20. In various embodiments, interface logic 25 may be used to interface messages and other transactions between cores 20 and a fabric to which processor socket 10 is coupled.

Interface logic 25 may include various structures such as buffers, trackers, logic and the like. In this way, interface logic 25 may be a core interface that can be used to synchronize control and data portions of a transaction that may flow through independent paths. Thus, while not shown in FIG. 1 for ease of illustration, it is to be understood that multiple paths between cores 20 and interface logic 25 may exist. Furthermore, it is to be understood that these different paths may be independent in-order paths such that command and data portions of a data transaction arrive at interface logic 25 from cores 20 in the same order. Thus if C1, C2, C3 represent command portions and D1, D2, and D3 represent corresponding data portions of three different data transactions, then an order of C2-C1-C3 implies an order of D2-D1-D3. The different paths may each operate at a different clock and/or at different throughputs. For example, if an on-socket interconnect is a ring, command and data portions of the same transaction may be traveling in two independent rings at different speeds and thus may arrive at interface logic 25 at different times. Also, incoming data transactions may be split along separate command and data buses. Furthermore, a fabric to which processor socket 10 is coupled may be running at an independent and different clock rate. Accordingly, as will be described further below, various structures, e.g., buffers within interface logic 25 may act as clock-crossing structures.

Transactions may be provided from interface logic 25 to a caching agent 30. Certain coherent path requests may be processed in caching agent 30, which may be used to generate and control snoop traffic. In addition, caching agent 30 provides data transactions from cores 20 to a router 35. Router 35 may determine based on information (e.g., address information) associated with a transaction whether the transaction is directed to a location within processor socket 10 or an off-chip location. Accordingly, router 35 passes the transaction either to a coherence controller 40 or off-chip via interconnects 38 and 39. In various embodiments, interconnects 38 and 39 may be point-to-point interconnects, although the scope of the present invention is not so limited. Interconnects 38 and 39 may be coupled to various entities, for example, a remote processor socket or another agent via a fabric.

Coherence controller 40 may receive coherent path requests that are received from either cores 20 of processor socket 10 or from remote agents. Coherence controller 40 may be used to determine whether a request is for a coherent piece of data, in other words a data location that is in a coherent state with respect to a given cache coherency protocol. Based on the determination in coherence controller 40, coherent path requests are provided to a memory controller 50. Memory controller 50 may be used to control transactions between processor socket 10 and one or more memories coupled thereto, e.g., via an interconnect 58. For example, a portion of system memory may be locally attached to processor socket 10 via interconnect 58. While described with this particular implementation in the embodiment of FIG. 1, it is to be understood that the scope of present invention is not limited in this regard and implementation of a processor socket may vary in different embodiments.

Figure 2:
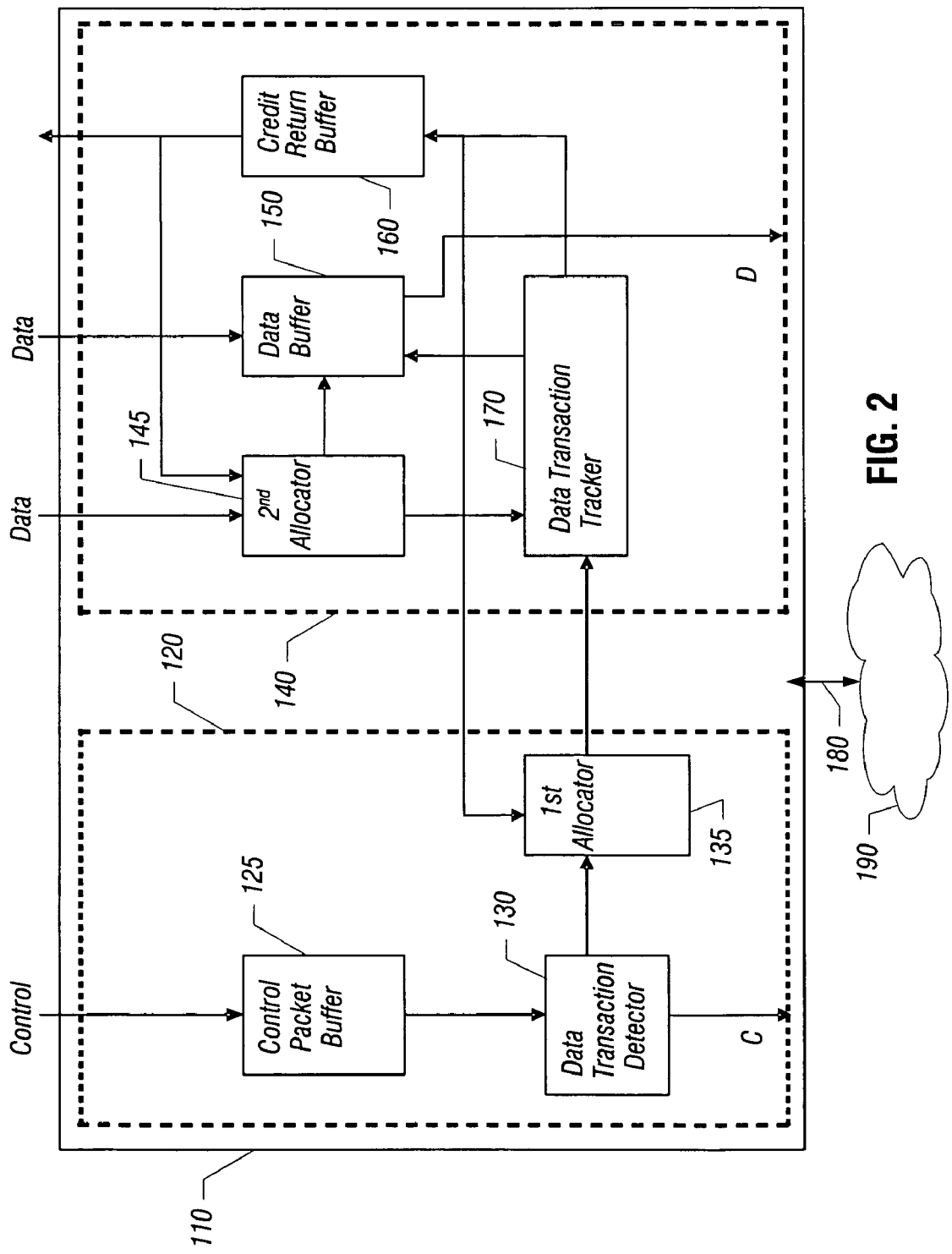
FIG. 2 is a block diagram of an interface in accordance with one embodiment of the present invention.

Referring now to FIG. 2, shown is a block diagram of an interface in accordance with one embodiment of the present invention. More particularly, FIG. 2 shows an interface coupled between one or more cores of a processor and a fabric to which the processor is coupled. For example, in one embodiment a processor may include a plurality of cores and an interface to provide data from the cores to a fabric to which the processor is coupled.

As shown in FIG. 2, interface 110 includes a control portion 120 and a data portion 140. Control portion 120 includes a control packet buffer 125, which may be a first-in first-out (FIFO) buffer, in one embodiment. Control packet buffer 125 may be coupled to receive incoming command information associated with transactions. Note the terms "control" and "command" are used interchangeably herein. Each transaction may be allocated an entry in control packet buffer 125. In turn, control packet buffer 125 is coupled to a data transaction detector 130, which may receive entries from control packet buffer 125 according to an order in which the packets are received by control packet buffer 125. Data transaction detector 130 may be used to decode information in the control packets, e.g., opcodes, to classify the transactions. More specifically, data transaction detector 130 may be used to classify transactions as data or non-data transactions. As examples, data transactions may be transactions related to victim evictions, processor writes or snoop responses (with data) from a processor core. However, it is to be understood that the scope of the present invention is not limited in this regard and in other embodiments additional types of data transactions may pass through interface 110.

If the transaction is determined to not be a data transaction, data transaction detector 130 may simply forward the command packet out of interface 110 along path C and to a fabric, e.g., via a point-to-point interconnect 180 coupled to a fabric 190. While described herein as being a point-to-point interconnect it is to be understood that the scope of the present invention is not limited in this regard and in other embodiments interconnect 180 may be another type of interconnect, such as another serial or parallel interconnect. While shown as being coupled to a fabric in the embodiment of FIG. 2, in many implementations such as that shown in FIG. 1, an interface in accordance with an embodiment of the present invention may be coupled between cores of a processor socket and other components of a processor socket prior to transmission to a fabric.

Still referring to FIG. 2, control portion 120 further includes a first allocator 135. First allocator 135, which may be a FIFO in some embodiments, may be used to identify a least recently deallocated (LRD) entry of a data buffer. In other words first allocator 135 may store entries identifying a deallocation order of the data buffer. If data transaction detector 130 determines that a transaction is in fact a data transaction, a read signal is provided to first allocator 135, which accesses an entry therein, which may be pointed to by a read pointer. This entry corresponds to the LRD entry in a data buffer of interface 110. In one embodiment, first allocator 135 may include N entries, where N corresponds to the number of entries present in the data buffer. Furthermore, each entry may be of a size log(N−1), however the scope of the present invention is not limited in this regard. When an entry of first allocator 135 is read according to the location of a read pointer, the data buffer index, i.e., the encoded index stored in the given entry of first allocator 135, may be sent to data portion 140, and more particularly to a data transaction tracker 170, which will be described further below.

Still referring to FIG. 2, interface 110 further includes a data portion 140. Data portion 140 includes various structures including a data buffer 150 that is coupled to receive incoming data from one or more cores of the processor. Data buffer 150 may be sized to include a number of entries (e.g., N entries), with each entry sized to receive data of a single data transaction. Incoming data is written into data buffer 150 at an entry pointed to according to a read pointer of a second allocator 145, which may be a FIFO of similar construction to that of first allocator 135. When second allocator 145 is clocked by an incoming data transaction, the entry pointed to by the read pointer is output to provide the index into data buffer 150 where the data of the data transaction is to be stored.

Note that second allocator 145 is coupled to be written by an output signal from a credit return buffer 160, which may be a FIFO in some embodiments. Credit return buffer 160 may be used to return credits for available data buffer entries to one or more processor cores to which interface 110 is coupled. In various embodiments, credit return buffer 160 may be used to prevent a deadlock scenario by ensuring that data writes into data buffer 150 do not arrive before second allocator 145 is written with the corresponding index. In this way, it may be ensured that data writes into data buffer 150 do not exceed the number of available entries in second allocator 145.

Data portion 140 further includes a data transaction tracker 170 that receives outputs of first allocator 135 and second allocator 145. Data transaction tracker 170 may include an entry for each corresponding entry in these allocators. More specifically, when first allocator 135 sends an output, which may correspond to a LRD data buffer index, data transaction tracker 170 will set a control indicator of its corresponding entry to indicate that a control packet for this data buffer entry is ready for transmission. Similarly, when the data is written into the corresponding entry in data buffer 150, second allocator 145 sends an output to data transaction tracker 170 to set the corresponding data indicator in this entry. Furthermore, when the data is successfully stored in data buffer 150, the data indicator portion of the corresponding entry in data transaction tracker 170 may also be set. Accordingly, data stored in data buffer 150 is ready to be transmitted, e.g., to a fabric or other interconnect when both indicators in the corresponding entry of data transaction tracker 170 are set. When an entry in data transaction tracker 170 is selected for transmission, a data read signal is sent from data transaction tracker 170 to data buffer 150 to cause the corresponding entry in data buffer 150 to be transmitted as a data packet out of interface 110 along path D. Note that in various embodiments, the same data read signal may be used to write an entry in both first allocator 135 and credit return buffer 160 at a location pointed to by a write pointer of these structures.

Due to different latencies through command portion 120 and data portion 140, as well as bandwidth mismatch between a processor interface and a fabric to which the processor is coupled, it is possible that at a given time multiple data buffer entries may be ready to be deallocated. In various embodiments, deallocation of data buffer entries may be implemented in a different order than allocation. As such, data buffer 150 does not act as a first-in-first-out buffer. It is to be understood that while generally transactions may be provided on an in-order basis, to improve performance in various situations, data may be transmitted out-of-order. First allocator 135 and second allocator 145 may be used to track the order of deallocation.

In various embodiments, first allocator 135, second allocator 145, data buffer 150, credit return buffer 160, and data transaction tracker 170 may all be sized to have the same number of the entries, for example, N entries. In some embodiments, data buffer 150 may be an array of size N×M, where N is the number of entries and M is the size in bits of each entry. In one such embodiment, each entry may be one cache line wide. Although the scope of the present invention is not limited in this regard, the cache line width may be 64 bytes, in one embodiment. Similarly, first allocator 135, second allocator 145, and credit return buffer 160 may be of a size N×logN.

In various embodiments, the values stored in the entries of first allocator 135, second allocator 145, and credit return buffer 160 may correspond to indexes of deallocated entries from data buffer 150. These indices may be encoded in different manners, in various embodiments. When an entry is deallocated from data buffer 150, data transaction tracker 170 may write the index of the deallocated entry into first allocator 135 and credit return buffer 160 simultaneously.

In operation, synchronization between command path and data path, which may be independent parallel in-order paths, may be maintained by maintaining synchronization between first allocator 135 and second allocator 145. Thus when a command portion of a data transaction is read from control packet buffer 125 and it is decoded in data transaction detector 130, first allocator 135 is read according to the read pointer to provide a data buffer index into data transaction tracker 170. In this way, a new data buffer entry is allocated within data transaction tracker 170. Furthermore, the control indicator portion of this entry may be set to indicate that the control portion of the data transaction is ready for transmission. When the corresponding data portion is received in data portion 140, it is guaranteed that the entry read from second allocator 145 allocates the same buffer entry for storage of the data in data buffer 150.

Figure 3:
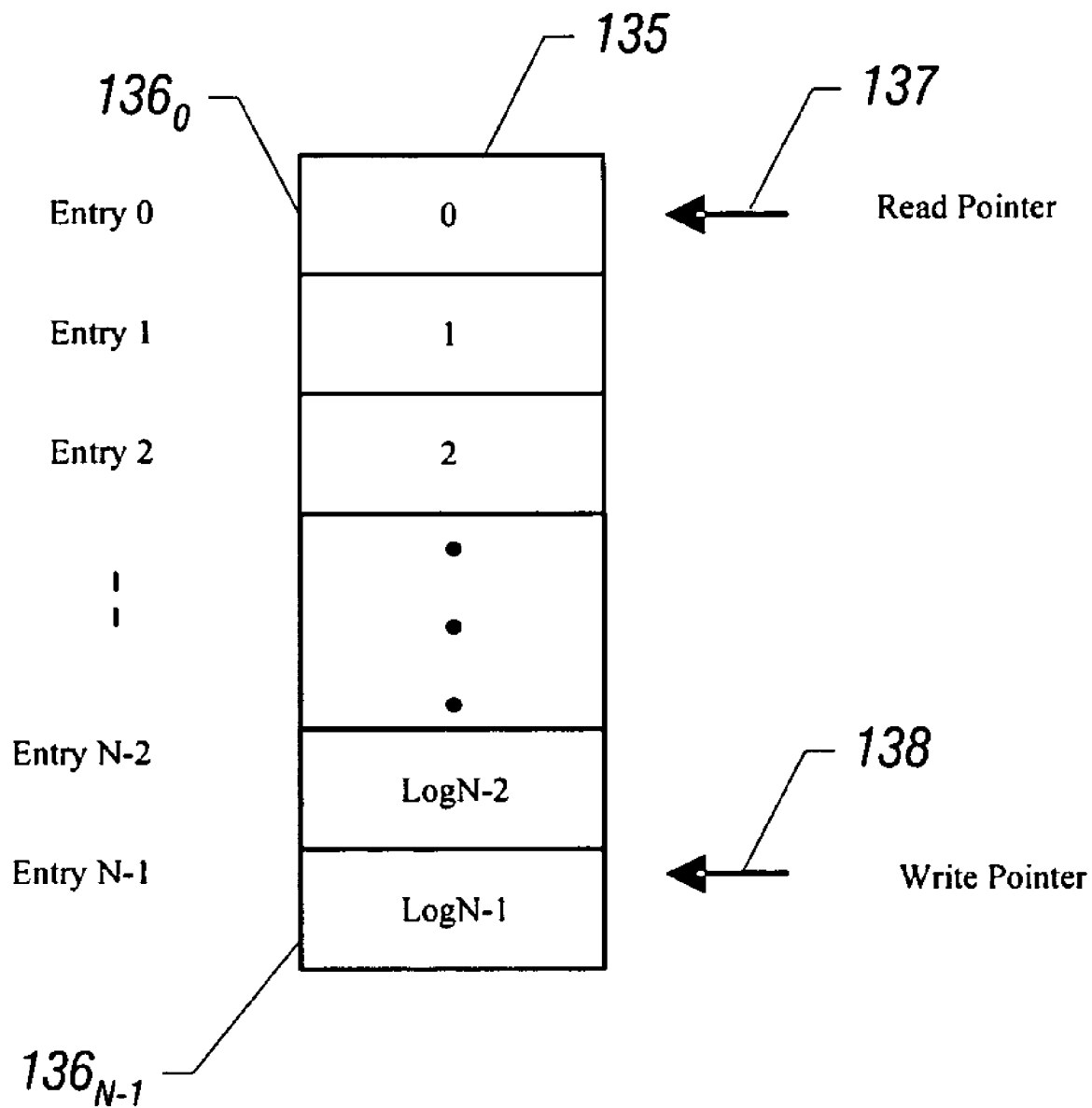
FIG. 3 is a block diagram of an allocator in accordance with one embodiment of the present invention.

Referring now to FIG. 3, shown is a block diagram of an allocator in accordance with one embodiment of the present invention. As shown in FIG. 3, first allocator 135 may be a FIFO buffer including a plurality of entries $136_0$-$136_{n-1}$ (generically entry 136). Each entry 136 may store a value corresponding to an encoded index into an associated data buffer. Accordingly, the number of entries 136 may correspond to the number of entries in the data buffer. As shown in FIG. 3, first allocator 135 may be accessed via a read pointer 137 and a write pointer 138. In the embodiment shown in FIG. 3, at reset, read pointer 137 may point to the first entry, i.e., entry $136_0$, while write pointer 138 may point to the last entry, i.e., $136_{n-1}$. While shown with this particular implementation in the embodiment of FIG. 3, it is to be understood that any other initialization values may be used. Furthermore, FIG. 3 shows the initialization values for entries 136. While shown with these particular values in FIG. 3, other initialization values may work so long as the index values from 0 to log(N−1) are used. Note that while FIG. 3 shows an implementation of first allocator 135, it is to be understood that in various embodiments, second allocator 145 may have a similar structure and may be initialized in like manner.

Figure 4:
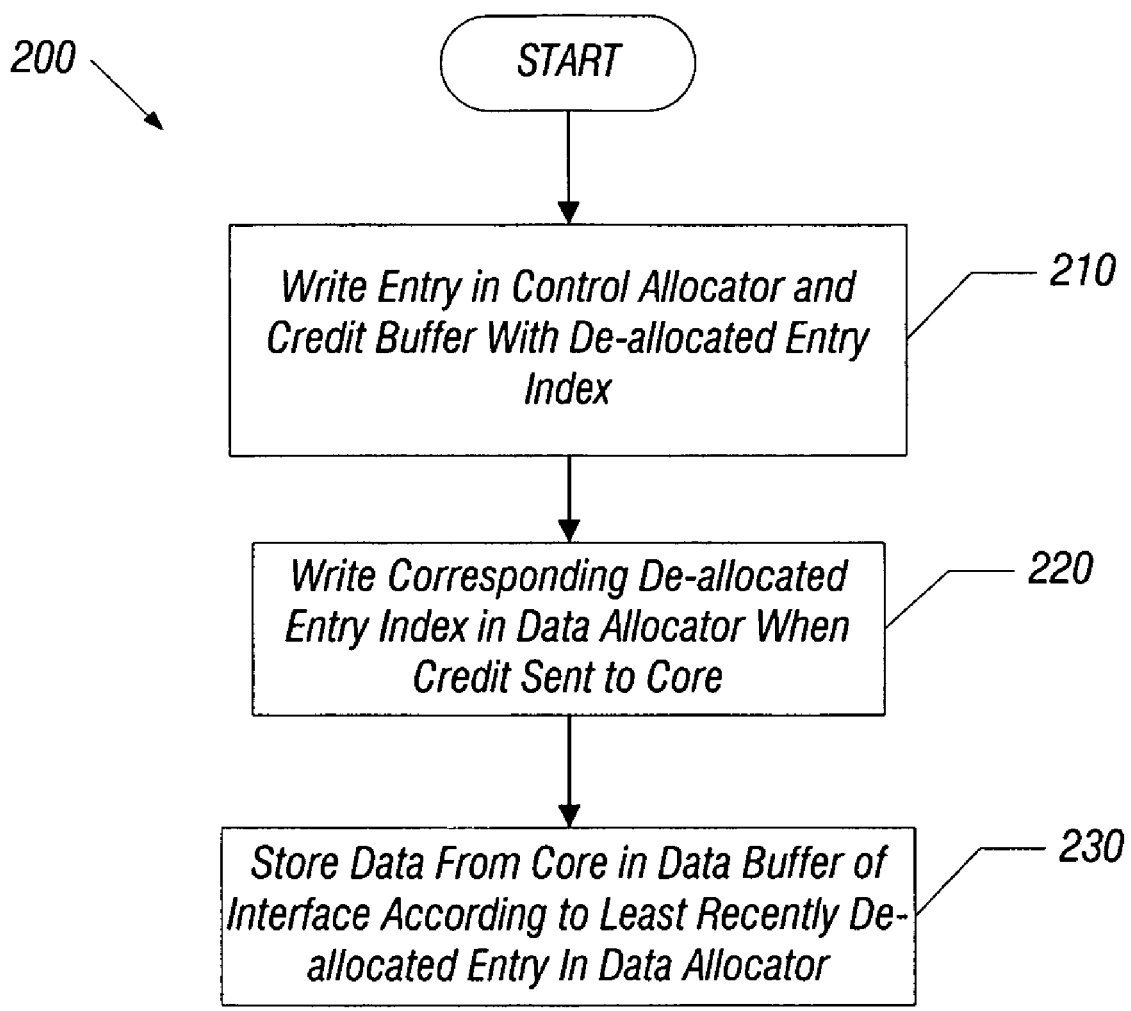
FIG. 4 is a flow diagram of a method in accordance with one embodiment of the present invention.

Referring now to FIG. 4, shown is a flow diagram of a method in accordance with one embodiment of the present invention. As shown in FIG. 4, method 200 may be used to synchronize data and control portions of a transaction that flows through independent paths. As shown in FIG. 4, method 200 may begin by writing an entry in a control allocator and a credit buffer with a deallocated entry index when a data packet is sent from an interface (block 210). That is, when a data portion of a transaction is sent from an interface, an entry corresponding to the location from which the data was sent may be written in multiple components including a control allocator such as a buffer and credit buffer such as a credit return buffer. In some embodiments, the entry may be written into the control allocator and credit buffer simultaneously, and furthermore it is to be understood that the entry may correspond to an encoded indication of the location of the deallocated entry, e.g., an encoded index.

Still referring to FIG. 4, next the same deallocated entry index may be written into a data allocator when a credit is sent to a core (block 220). That is, the credit buffer may send credit messages to one or more cores to which the interface is coupled to enable the core to send additional data packets for transmission. Such credit messages thus ensure that the data buffer and associated data allocator have sufficient space for storing incoming data packets. By writing the same value into the data allocator (i.e., in the corresponding entry of the data allocator as both the credit buffer and the control allocator), it is guaranteed that the corresponding incoming data written into the data buffer is written to the appropriate entry.

Still referring to FIG. 4, next incoming data from the core may be stored in the data buffer in the interface (block 230), and more specifically in the entry of the data buffer at which the read pointer of the data allocator is set. This entry corresponds to the least recently deallocated (i.e., oldest in time) entry in the data buffer. While described with this particular implementation in the embodiment of FIG. 4, it is to be understood that the scope of the present invention is not limited in this regard. For example, in other implementations a single allocator or buffer may be used by both the control portion and the data portion of the interface to synchronize the portions.

Figure 5:
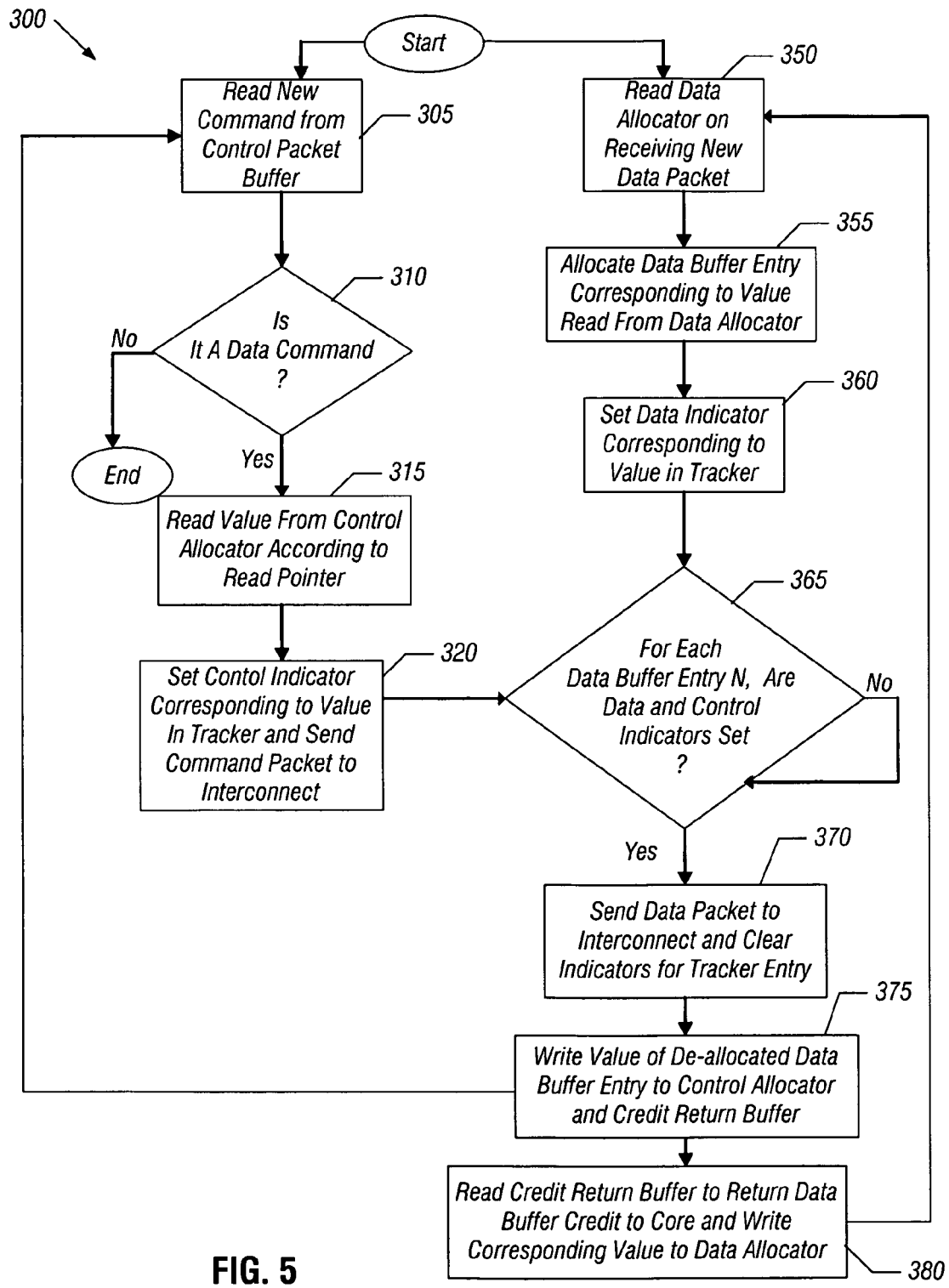
FIG. 5 is a flow diagram of a technique for synchronizing control and data paths in accordance with an embodiment of the present invention.

Referring now to FIG. 5, shown is a flow diagram of a more detailed technique for synchronizing control and data paths in accordance with an embodiment of the present invention. As shown in FIG. 5, method 300 may operate along parallel paths, namely a first path to be implemented in a control path and a second path to be implemented in a data path, e.g., of an interface coupled between one or more processor cores and an interconnect coupled to a processor socket. As shown in FIG. 5, the control path portion of method 300 may begin by reading a new command from a control packet buffer (block 305). It may be determined whether this command is a data command (diamond 310). If not, method 300 may conclude with respect to that command. Accordingly, the command may be transmitted out of the interface and along the interconnect.

Still referring to FIG. 5, if instead it is determined that the command is of a data transaction, control passes to block 315. There, a value may be read from a control allocator according to a read pointer of the allocator (block 315). For example, the control allocator may be a FIFO having a read pointer and a write pointer. The read pointer may identify the least recently accessed entry of the FIFO. This entry may similarly correspond to the least recently deallocated entry in a data buffer of the data path. The value stored in the entry may correspond to an encoded index of this data buffer entry, in some embodiments.

Next, a control indicator may be set corresponding to the value. More specifically, an entry in a tracker table corresponding to the value may have its control indicator set to indicate that this command packet is present and ready to be transmitted (block 320). Furthermore, the command packet may be transmitted along the interconnect (block 320 also). Note that the setting of the control indicator may cause control to pass to diamond 365 of the data path portion, which will be discussed further below.

Still referring to FIG. 5, the data path portion may begin by reading a data allocator on receipt of an incoming (i.e., new) data packet (block 350). That is, a data allocator which may be a FIFO may output an entry pointed to by its read pointer. This value stored in the entry may correspond to an encoded index of the location in the data buffer in which the new data is to be stored. Accordingly, the data buffer entry may be allocated corresponding to the value read from the data allocator (block 355).

Furthermore, when the data is stored in the appropriate data buffer entry, a data indicator corresponding to the entry (i.e., the value) may be set in the tracker table (block 360). Then control passes to diamond 365. There, for each data entry N, it may be determined whether both data and control indicators are set in the tracker table. If not, diamond 365 loops back on itself. If both indicators are set, indicating that both command and data portions are ready, control passes block 370. There, a data packet may be sent to the interconnect and both indicators for the entry in the tracker may be cleared (block 370). Furthermore, in various embodiments it is to be understood that if more than one such data buffer entry is ready for transmission at a given time, an analysis may be performed to determine appropriate ordering of data packet transmission, so that data packets may be sent in an out-of-order manner if desired.

In various embodiments, the type of data transaction may be used to determined appropriate ordering. For example, in some implementations, data packets that provide dirty data responsive to a snoop request may take precedence over other transactions. These other transactions may correspond to victim evictions or non-coherent data writes.

Still referring to FIG. 5, when a data packet is sent along the interconnect, the value of the deallocated data buffer entry may be written to both the control allocator and a credit return buffer (block 375). Note that for the control path, control passes from block 375 to block 305, discussed above. For the data path, control passes to block 380. There, the credit return buffer may be read to return a data buffer credit to a core and write the corresponding value (e.g., the most recently deallocated buffer) to the data allocator (block 380). From block 380 the data path returns control to block 350, discussed above. While described with this particular implementation in the embodiment of FIG. 5, it is to be understood that the scope of the present invention is not limited in this regard and synchronizing multiple paths over which a transaction flows may be realized differently in other embodiments.

Figure 6:
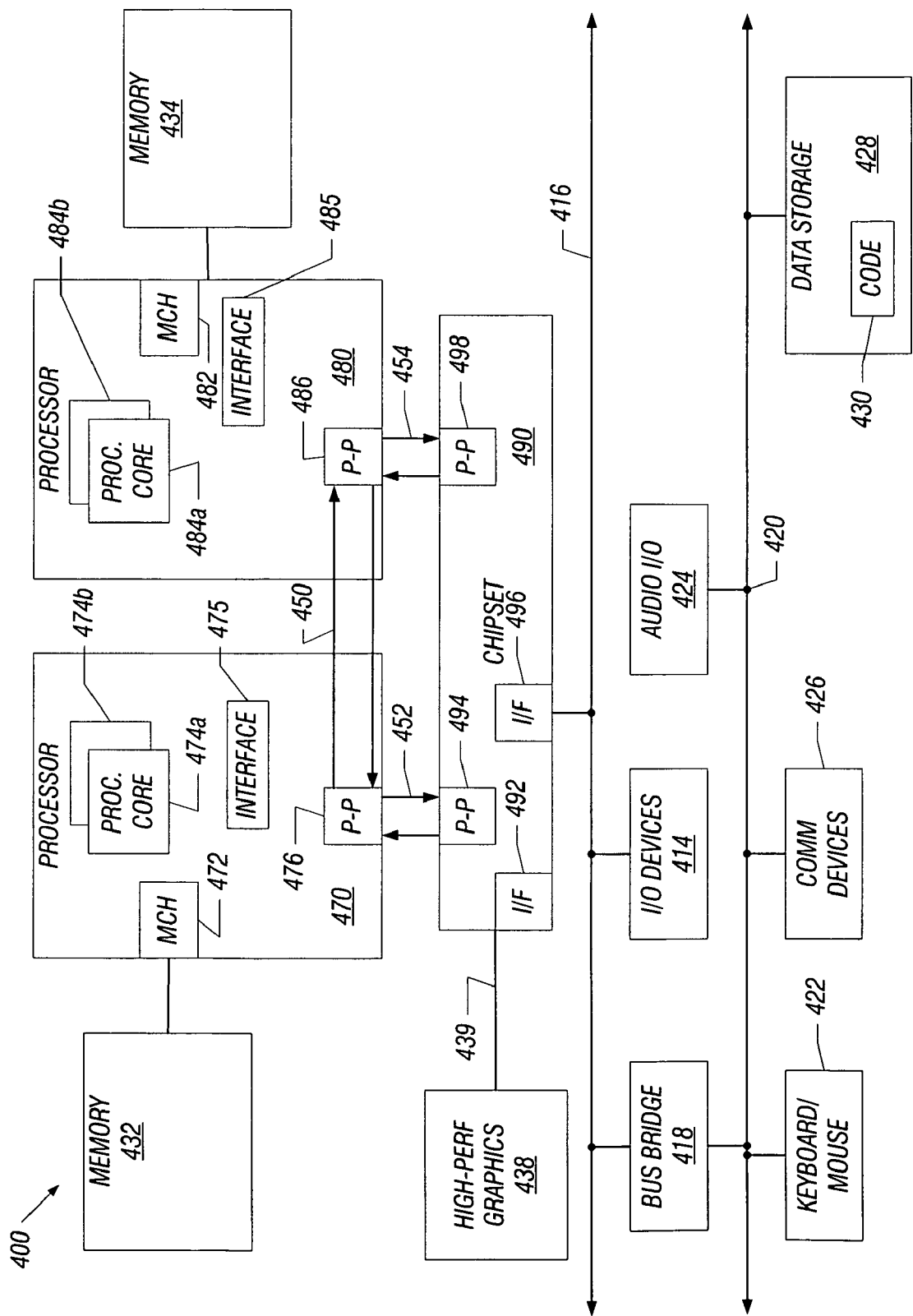
FIG. 6 is a block diagram of a system with which embodiments of the present invention may be used.

Embodiments may be implemented in many different system types. Referring now to FIG. 6, shown is a block diagram of a multiprocessor system in accordance with an embodiment of the present invention. As shown in FIG. 6, multiprocessor system 400 uses a point-to-point interconnect system. A first processor 470 and a second processor 480 are coupled via a point-to-point interconnect port 450. As shown in FIG. 6, each of processors 470 and 480 may be multicore processors, including first and second processor cores (i.e., processor cores 474a and 474b and processor cores 484a and 484b). First processor 470 includes an interface 475 and second processor 480 includes an interface 485. Such interfaces in accordance with an embodiment of the present invention may include various buffers and other structures to synchronize separate control and data paths of data transactions passing from cores of the given processor to other components to which the processors are coupled. First processor 470 further includes a memory controller hub (MCH) 472 and a point-to-point (P-P) interface 476. Similarly, second processor 480 includes a MCH 482 and a P-P interface 486. As shown in FIG. 6, MCH's 472 and 482 couple the processors to respective memories, namely a memory 432 and a memory 434.

A physical layer contains ports to connect processors 470 and 480 to an external chip, e.g., a chipset 490, and a routing layer routes processor packets to targets through the physical ports. First processor 470 and second processor 480 may be coupled to chipset 490 via P-P interconnect ports 452 and 454, respectively. As shown in FIG. 6, chipset 490 includes P-P interfaces 494 and 498. Furthermore, chipset 490 includes an interface 492 to couple chipset 490 with a high performance graphics engine 438. In one embodiment, a point-to-point interconnect 439 may couple these components. In turn, chipset 490 may be coupled to a first bus 416 via an interface 496.

As shown in FIG. 6, various input/output (I/O) devices 414 may be coupled to first bus 416, along with a bus bridge 418, which couples first bus 416 to a second bus 420. Second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Note that other architectures are possible. For example, instead of the point-to-point architecture of FIG. 6, a system may implement a multi-drop bus or another such architecture.

Embodiments may be implemented in code and may be stored on a machine-readable storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining if a control portion and a data portion of a data transaction are ready to be sent from an interface coupled to at least one core of a processor based on a control indicator that indicates that the control portion is ready to be sent and a data indicator that indicates that the data portion is ready to be sent, the control indicator and the data indicator stored in an entry in a transaction tracker;
   sending the data portion from an entry of a data buffer of the interface out of the interface and deallocating the entry, if the control portion and the data portion are ready; and
   writing a value corresponding to the deallocated entry in a first buffer and a credit buffer of the interface, the value to indicate the deallocated entry as the most recently deallocated entry from the data buffer, wherein the first buffer is to store a plurality of entries to identify a deallocation order of the data buffer and output one of the entries to enable the control indicator to be set in the transaction tracker entry, and the credit buffer is to return credits for available data buffer entries to the at least one core.

2. The method of claim 1, further comprising storing the data portion in the entry of the data buffer at a location controlled by a signal from a second buffer of the interface, wherein the entry comprises a least recently deallocated entry of the data buffer.

3. The method of claim 2, further comprising writing an entry in the second buffer when the credit buffer sends a credit return message to the at least one core, the entry written with the value corresponding to the deallocated entry.

4. The method of claim 1, further comprising sending the data portion from the entry of the data buffer in a different order than the entry was written.

5. The method of claim 1, further comprising receiving the control portion and the data portion in the interface along independent paths.

6. The method of claim 1, further comprising decoding the control portion in the interface to determine whether an incoming transaction is a data transaction.

7. An apparatus comprising:
an interface to be coupled between at least one processor core and an interconnect, the interface including:
a data portion including a data buffer having entries to store data packets received from the at least one processor core, a data allocator to store entries each corresponding to deallocation of an entry in the data buffer and to identify a deallocation order of the data buffer entries, and a transaction tracker including a corresponding entry for each entry in the data buffer and having a control indicator and a data indicator, wherein the transaction tracker is to generate a read signal to cause a data packet in a selected entry of the data buffer to be sent to the interconnect when the control indicator indicates that the control portion is ready to be sent and the data indicator indicates that the data portion is ready to be sent; and
a control portion including a control allocator to store entries each corresponding to deallocation of an entry in the data buffer and to identify the deallocation order of the data buffer entries.

8. The apparatus of claim 7, wherein the control portion further comprises a packet buffer to receive incoming control packets from the at least one processor core.

9. The apparatus of claim 7, further comprising a credit buffer to store entries each corresponding to deallocation of an entry in the data buffer and to identify the deallocation order of the data buffer entries, wherein an entry in the credit buffer is written simultaneously with a corresponding entry in the control allocator.

10. The apparatus of claim 8, wherein the transaction tracker is to enable out-of-order transmission of at least one data packet from the data buffer.

11. The apparatus of claim 8, wherein the transaction tracker is to generate a write signal to store a value of the selected entry of the data buffer in the control allocator after the data packet is sent.

12. The apparatus of claim 8, wherein the control portion further comprises a transaction detector coupled to the packet buffer to determine if the incoming control packets are of data transactions.

13. The apparatus of claim 8, wherein the control portion and the data portion are to receive the incoming control packets and the data packets along independent paths.

14. The apparatus of claim 7, wherein the apparatus comprises a processor including a plurality of processor cores coupled via a bus cluster, wherein the interface is coupled between the bus cluster and the interconnect.

15. The apparatus of claim 7, wherein the control allocator and the data allocator comprise buffers to store encoded index information regarding deallocation of entries in the data buffer according to read and write pointers.

16. The apparatus of claim 15, wherein the read and write pointers of the control allocator and the data allocator are controlled to be in synchronization.

17. A system comprising:
a processor including an interface, the interface having:
a first buffer to store first entries corresponding to a deallocation order of a data buffer;
a second buffer to store second entries corresponding to the deallocation order;
a credit buffer to return credits for available entries in the data buffer to at least one core of the processor and to store third entries corresponding to the deallocation order, wherein on deallocation of a first entry from the data buffer a first value is to be stored concurrently in one of the first entries of the first buffer and one of the third entries of the credit buffer and the first value is to be stored in one of the second entries of the second buffer when a credit is sent from the credit buffer;
a tracker to arbitrate between multiple data packets ready for transmission from the data buffer, the tracker including a plurality of entries each to store a control indicator to indicate whether a control packet is ready to be sent and a data indicator to indicate whether a data packet is ready to be sent, wherein the first buffer is to output one of the first entries to enable the control indicator to be set in the corresponding tracker entry; and
the data buffer to store the data packet in an entry accessed based on a signal received from the second buffer; and
a dynamic random access memory (DRAM) coupled to the processor.

18. The system of claim 17, wherein the interface is coupled between the at least one core of the processor and an interconnect.

19. The system of claim 18, wherein the interface is to receive control packets from the at least one core on a control path coupled to the first buffer and to receive data packets from the at least one core on a data path coupled to the second buffer and the data buffer.

20. The system of claim 19, wherein the control path and the data path comprise independent in-order paths each to operate a different rate.

21. The method of claim 1, further comprising sending the data portion out of the interface on a first independent path and sending the control portion out of the interface on a second independent path, the first and second independent paths to operate at different rates.

22. The method of claim 1, wherein the value corresponds to an encoded indication of a location of the deallocated entry.

23. The method of claim 1, wherein the value written in the first buffer and the credit buffer is the same value.

* * * * *